United States Patent Office 3,503,632
Patented Mar. 31, 1970

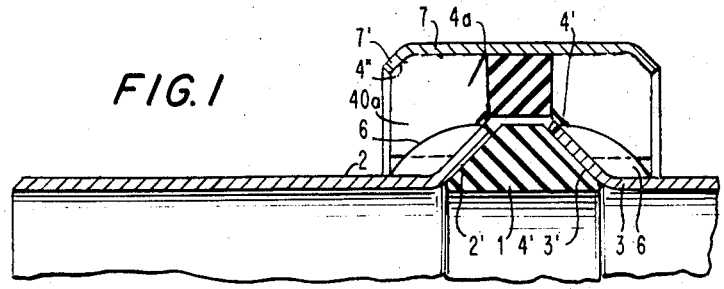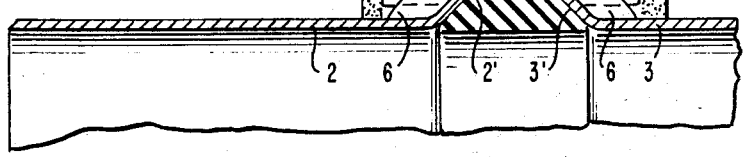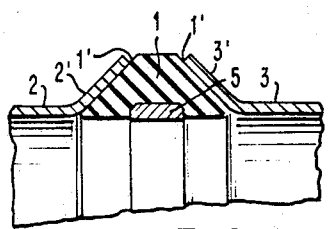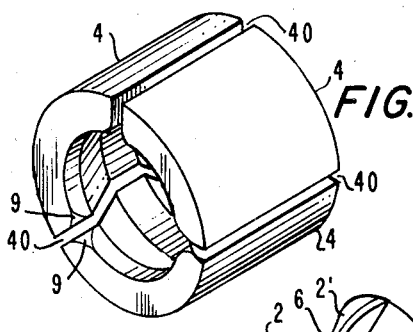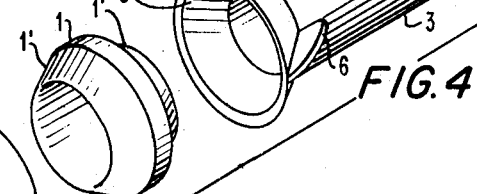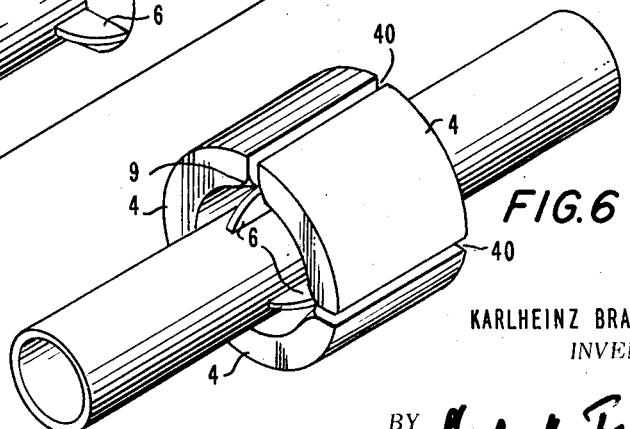
KARLHEINZ BRAUN
INVENTOR.

3,503,632
ELECTRICALLY INSULATING PIPE COUPLING ASSEMBLY, PARTICULARLY FOR SMALL DIAMETER PIPES
Karlheinz Braun, Pfarrgasse 6, Kehl (Rhine), Germany
Filed July 29, 1968, Ser. No. 748,490
Int. Cl. F16l *11/12*
U.S. Cl. 285—48                                3 Claims

ABSTRACT OF THE DISCLOSURE

A pair of pipe stubs, to be assembled together, terminate in facing flared end sections. The flared ends of the pipe stubs have radial fins formed at the outside. A spacing ring having an essentially trapeze-shape cross section is located between the flared sections, to separate them electrically and seal them hydraulically; to secure the assembly together, a coupling clamp ring of electrically insulating material formed of independent sectors surrounds the flared ends of the pipe stubs. An outer compression sleeve surrounds the coupling clamp ring and holds the parts together.

---

The present invention relates to electrically insulating pipe coupling assemblies, and more particularly to an arrangement to interconnect a pair of pipe stubs of small diameter.

Various couplings, electrically isolating the pipes to be coupled together, are known. Such couplings do, however, usually require an appreciable number of parts and are therefore expensive to manufacture. Additionally, if the pipes are to be connected by threaded couplings, means must be provided to prevent relative rotation of the pipes with respect to each other. Thus, threaded couplings, or welds have often been used. Such interconnections, for pipe lines of substantial diameter and capable of withstanding high pressures, are economically justified. For small diameter pipes, such as are used to connected houses and homes, for example, it is desirable that such additional costs arising out of further machining, material, and labor be avoided. Such pipes, of from ¼-inch to 2-inch diameter should be capable of being interconnected hydraulically while remaining isolated electrically, without requiring couplings of mechanical complexity and high cost.

Couplings providing for electrical isolation are particularly used when copper tubing is to be interconnected with steel pipes, or with a steel tank, in order to avoid electrolytic corrosion due to the different materials; they are further desirable in fuel supply lines, gasoline lines, and in connection with pipes which are to be cathodically protected against corrosion by electro-chemical action. Electrical isolation also breaks stray currents which may occur in the pipes, and currents induced, for example, due to effects of neighboring transmission lines.

It is an object of the present invention to provide an electrically insulating type coupling of low cost, particularly suitable for pipes of smaller diameter, and not requiring screw threads or welds, and which can be made by mass-production techniques.

One solution for the manufacture of a thread-less coupling proposed the formation of facing flanges at opposed pipe stubs, with insulating and spacing rings between the flanges, the flanges and spacing rings being held together jointly by a compression ring surrounding the assembly. It has been found that such a construction is difficult to manufacture and may lead to leaks since compression in axial direction must be carried out without radial compression being possible. Additionally, the parts are not secured against relative rotation and such a coupling requires differently manufactured parts for each pipe size. Such a coupling is described in detail, for example in Belgian Patent 635,139.

It is a further object of the present invention to provide a pipe coupling which remains tight and is not subject to leaks, but still being capable of resisting twist and transferring rotational forces from one pipe stub to the other.

SUBJECT MATTER OF THE PRESENT INVENTION

Briefly, in accordance with the present invention, the first of a pair of pipe sections are flared outwardly, cone or funnel shaped, to face each other. A spacing ring, preferably of trapezoidal, or triangular cross section is located between the flared faces, the sealing ring having tapered sides which fit into the flared stubs. The flared stubs have external fins formed thereon. The flared stubs, with the sealing ring therebetween, are held together by a slotted coupling clamp ring, the fins fitting between the slots, so that torque from one pipe stub to the other is transferred thereto. Surrounding the assembly is a compression sleeve to maintain the slotted coupling clamp ring in position. The slotted coupling clamp ring, which is of electrically insulating material, may be formed of a number of separate sectors, for example three, separately placed between equidistantly located fins (if three—spaced 120° apart), the entire assembly held together by the outer compression sleeve, which is preferably of metal.

The compressor sleeve may be formed with a beveled, inturned edge, fitting over the coupling clamp ring, or may extend therebeyond, with epoxy resin being poured in the ends to seal the pipes and the coupling assembly together into one unitary whole and prevent contamination by moisture or dirt.

For pipes of somewhat larger diameter, it may be desirable to include an internal stiffening ring, for example of metal, reinforcing the sealing ring and preventing distortion thereof when the flared pipe ends are compressed together.

The structure, organization, and operation of the invention will now be described more specifically with reference to the accompanying drawings, wherein:

FIG. 1 is a longitudinal axial cross sectional view of the pipe coupling in accordance with the present invention, the symmetrical lower part having been omitted;

FIG. 2 is a view similar to FIG. 1 of a different embodiment of the invention;

FIG. 3 is a view similar to FIG. 1 of a different embodiment of a sealing ring with a stiffening member, omitting the outer slotted coupling clamp ring and the compression sleeve;

FIG. 4 is a perspective view of the pipe coupling, in exploded showing, before application of the coupling clamp ring;

FIG. 5 is a perspective view of the clamp ring to fit over the coupling of FIG. 4; and FIG. 6 is a perspective view of the assembled coupling without, however, the outer compression sleeve and showing separate sectors of the coupling clamp ring.

A spacer and sealing ring 1, of insulating material, for example a carbon-free rubbery substance such as artificial rubber, known under the trademark of "Neoprene" or similar synthetic elastomer, for example an acrylnitril synthetic rubber, or a carbon-free buna vulcanized element, having a generally triangular, or trapeze shaped cross section, separates a pair of pipe stubs 2, 3, having flared, conically or funnel shaped ends 2', 3'. The slope of the slanting sides 1' of the sealing ring matches the taper of the conical ends 2', 3', which are to be separated and which may, for example, consist of copper and steel respectively. A coupling ring 4a (FIG. 1) or 4, (FIG. 2) is placed over the assembly to couple the pipe stubs together. Coupling ring 4a (FIG. 1) consists of a single piece of material, having slots 40 a cut therein; coupling ring 4 (FIGS. 2, 4, 6) consists of three separate sector parts forming, when assembled together, an essentially ring-shaped structure separated by the slots 40. Both coupling rings 4, and 4a, have internally diverging conical surfaces 4' (FIGS. 1, 2) matching the outer flare of the pipe edge 2', 3', and surrounding the assembled pipe stubs to clamp them together. Upon assembly, pipes 2 and 3 will have axial pressure applied thereagainst to seal the pipes together and affect a tight connection. The inner sealing ring 1 may tend to escape between the conical surface of ends 2', 3' inwardly. The inherent stiffness and strength of the sealing ring is usually sufficient for pipe diameters of about ½ inch or less in order to effectively resist such compression, and tightly seal the pipe stubs together. If larger diameters are to be sealed, a stiffening ring 5 (FIG. 3) may be used internally to prevent escape of material of sealing ring 1 internally. Preferably, the width of the stiffening member is approximately the width of the upper flat surface of the trapeze formed by the cross section of the sealing ring, as seen in FIG. 3. As will be evident from the Figure, the two pipes, 2, 3, are still effectively electrically insulated from each other.

In order to prevent relative rotation of the pipe stubs 2, 3, with respect to each other, for example upon application of a threaded pipe coupling to either end (which is not shown) radially directed fins 6 are formed adjacent the ends 2', 3' on the pipes. These fins may be made, for example, by upsetting the material, or by welding or otherwise securing separate fins thereto. The number of fins 7 is equal to the number of slots 40 of the coupling clamp ring 4, for example three fins located evenly spaced, that is 120° apart, around the circumference of the pipe ends 2', 3' each. Upon assembly of the pipe stubs into the coupling clamp ring, the fins will fit between the slots 40 as seen in FIG. 6. Thus, torque applied to one of the pipe stubs will be transferred from fin 6 to one of the sectors of the clamp ring and then again to the fins 6 on the opposite pipe stub.

The entire assembly is secured together by means of an outer compression sleeve 7, for example made of steel, and acting as a circular clamp. Compression sleeve 7 is slid over the sectors forming the clamp ring, to secure the assembly together. In the embodiment of FIG. 1, ring 4a is slightly beveled at the edges 4, and the end portions 7' of sleeve 7 are likewise beveled, to be retained in place.

A preferred embodiment of the invention is illustrated in FIG. 2. Compression sleeve 7 is made to be slightly longer than coupling clamp ring 4, and the space between the coupling clamp ring and the end of compression sleeve 7 is filled with a flowable synthetic resin, such as epoxy resin 8. Filling the space with epoxy further seals the entire coupling assembly against possible penetration of dirt or contaminents. Since the epoxy will penetrate within the assembled part, and within the slots, it is desirable to form the internal edges of the coupling clamp ring 4 with reliefs or bevels, as seen at 9, in order to prevent possible failure due to hairline cracks occurring at the corners.

The compression sleeve 7 holds the entire assembly tightly together, and provides both for axial compression, due to the flared ends of 2', 3', of pipe stubs 2, 3, as well as for radial retention in place of sealing ring 1 in the face of pressures within the pipe stubs 2, 3. The cooperation of the conical surfaces provides for sufficient electrical insulation as well as for mechanical strength of the entire coupling assembly, and further enables use with substantial internal pressure without leakage. Without additional parts, or labor upon assembly and manufacture, relative rotation of the two pipe stubs is effectively prevented. By forming the coupling clamp ring 4 in separate sectors, which can be separately assembled, and then slipping a sleeve 7 thereover, manufacture and assembly of the entire coupling is greatly simplified, and further enables use of sector elements for pipes of different sizes. The manufacturing tolerance of the pipes, the degree of flare of the ends, and of the sealing elements themselves, need not be great. The slots between the sectors of the coupling clamp ring enable the pipes to have a certain amount of play, during manufacture, so that possible inaccuracies, or out-of-round conditions are self-compensated. Sealing the entire assembly then with epoxy, as at 8, (FIG. 2), effectively secures the pipes together and seals the assembly in place, once it has been self-aligned. Internal pressure, within the pipe, tends to force the sealing ring 1 outwardly, thus increasing the sealing effect of the ring 1 against the flared surfaces of the pipe stubs, and further compressing the sector material as well as the material of sealing ring 1, against the holding force of outer surrounding compression sleeve 7, thus providing for safe-sealing action under use and increased pressure.

Manufacture of the various parts are simple; sealing ring 1, preferably consisting of an elastomer or neoprene as above referred to, is preferably extruded in the desired form, and then vulcanized. The sectors of the coupling clamp ring 4 are preferably made of a synthetic material having substantial stiffness, for example a polyamide, and made either as a plastic extrusion core, or as an injection molding, inexpensively manufactures to accurate sizes and without subsequent machining, by mass production. A suitable material is known under the trademark Ultramid.

The outer compression sleeve 7 is preferably made out of steel, for example stainless steel, and slipped over the assembled pipe coupling, that is over the sectors of coupling ring 4. By use of a two-component epoxy, which is freely flowable, all gaps, slots and cracks between the sectors of the coupling clamp ring 4, and the fins are filled, completely sealing the entire assembly against contamination and providing for a high stability of the coupling to resist bending, twist, or other mechanical loading.

The invention is applicable in connection with any pipes for any uses, that is to transport fluids, whether liquid or gas, or to contain devices such as cables, which are to be sealed-in and separated from their surroundings.

I claim:

1. Electrically insulating pipe coupling assembly having a pair of pipe stubs (2, 3), both said pipe stubs terminating in facing, flared end sections (2', 3');

outwardly projecting radial fins (6) formed on said end sections;

a spacing ring (1) of electrically insulating material located between said flared end sections and having tapered surfaces (1') fitted into said flared stub;

a coupling clamp ring (4) of electrically insulating material formed of a plurality of independent sectors circumferentially spaced from each other, said fins positioned between said sectors, and said ring having conical internal surfaces (4') matching the outer surfaces of said flared ends to receive said ends and hold said stubs, with said spacing ring therebetween together;

and a compression sleeve (7) surrounding said clamp ring sectors (4) holding said sectors in position, around said stubs and in engagement with said stubs and fins, whereby said spacing ring (1) will be compressed against said flared ends (2', 3') to provide a tight seal and said fins (6) prevent relative rotation of said pipe stubs with respect to each other.

2. Assembly according to claim 1 wherein said ring comprises three sectors covering about 120° each, and three fins are provided on each pipe stub spaced circumferentially 120°.

3. Assembly according to claim 1 including an electrically insulating resinous material filling all the unoccupied area in said assembly.

References Cited

UNITED STATES PATENTS

| | | | |
|---|---|---|---|
| 1,040,971 | 10/1912 | Wirt | 285—50 |
| 1,170,920 | 2/1916 | McCarthy | 285—53 X |
| 3,038,743 | 6/1962 | Zaloumis | 285—51 |
| 3,328,053 | 6/1967 | Mattimore et al. | 285—50 |

FOREIGN PATENTS

| | | |
|---|---|---|
| 103,968 | 5/1938 | Australia. |
| 536,846 | 5/1941 | Great Britain. |

REINALDO P. MACHADO, Primary Examiner

D. W. AROLA, Assistant Examiner

U.S. Cl. X.R.

174—85; 285—334.5, 371